(12) United States Patent
Liu

(10) Patent No.: US 10,241,611 B2
(45) Date of Patent: Mar. 26, 2019

(54) METHOD AND DEVICE FOR ADJUSTING OBJECT ATTRIBUTE INFORMATION

(71) Applicant: BAIDU ONLINE NETWORK TECHNOLOGY (BEIJING) CO., LTD., Beijing (CN)

(72) Inventor: Junqi Liu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/325,272

(22) PCT Filed: Jun. 18, 2015

(86) PCT No.: PCT/CN2015/081872
§ 371 (c)(1),
(2) Date: Jan. 10, 2017

(87) PCT Pub. No.: WO2016/078405
PCT Pub. Date: May 26, 2016

(65) Prior Publication Data
US 2017/0192589 A1 Jul. 6, 2017

(30) Foreign Application Priority Data
Nov. 19, 2014 (CN) .......................... 2014 1 0663111

(51) Int. Cl.
*G06F 1/16* (2006.01)
*G06F 3/0484* (2013.01)
(Continued)

(52) U.S. Cl.
CPC .......... *G06F 3/0416* (2013.01); *G06F 1/1686* (2013.01); *G06F 1/1694* (2013.01);
(Continued)

(58) Field of Classification Search
CPC ...... G06F 3/017; G06F 3/0346; G06F 3/0488; G06F 3/005; G06F 3/0416; G06F 3/0482;
(Continued)

(56) References Cited

U.S. PATENT DOCUMENTS 9,521,245 B2 * 12/2016 Yang ...................... G04G 21/04
9,658,767 B2 * 5/2017 Ogita .................... G06F 1/1626
(Continued)

FOREIGN PATENT DOCUMENTS

CN 101248989 8/2008
CN 102221877 A 10/2011
(Continued)

OTHER PUBLICATIONS

ISA/CN, International Search Report for PCT/CN2015/081872, dated Sep. 8, 2015.
(Continued)

*Primary Examiner* — Dismery Mercedes
(74) *Attorney, Agent, or Firm* — Hodgson Russ LLP

(57) ABSTRACT

The present disclosure provides a method and a device for adjusting object attribute information. The method for adjusting object attribute information includes: acquiring a motion trail of a terminal according to a user's operation on the terminal; determining a palm length of the user according to the motion trail and pre-stored somatotype characteristic information; and adjusting attribute information of an operable object in a current interface of the terminal according to the palm length of the user. In embodiments of the present disclosure, by adjusting the attribute information such as the size and location of the operable object, it is convenient for the user to perform related operations, thereby improving operation experience of the user.

15 Claims, 5 Drawing Sheets

(51) Int. Cl.
*G06F 3/041* (2006.01)
*G06T 7/20* (2017.01)
*G06F 3/0346* (2013.01)
*G06F 3/0481* (2013.01)
*G06F 3/0488* (2013.01)
*G06F 3/0489* (2013.01)
*G06F 3/0482* (2013.01)
*H04M 1/725* (2006.01)
*H04M 19/04* (2006.01)

(52) U.S. Cl.
CPC ............ *G06F 3/0346* (2013.01); *G06F 3/041* (2013.01); *G06F 3/0481* (2013.01); *G06F 3/0482* (2013.01); *G06F 3/0484* (2013.01); *G06F 3/04886* (2013.01); *G06F 3/04897* (2013.01); *G06T 7/20* (2013.01); *H04M 1/72569* (2013.01); *H04M 19/04* (2013.01); *G06F 3/0488* (2013.01); *G06F 2200/1637* (2013.01); *G06T 2207/30241* (2013.01); *H04M 2250/12* (2013.01)

(58) Field of Classification Search
CPC ...... G06F 3/04842; G06F 3/041; G06F 21/32; G06F 1/1626; G06F 1/1694; G06F 1/1686; G06T 7/20; G06T 7/292; G06T 2207/30221; G06T 2207/10016; G06T 2207/30241; H04M 2250/12; H04M 1/72572
See application file for complete search history.

(56) References Cited

U.S. PATENT DOCUMENTS

| | | | | |
|---|---|---|---|---|
| 9,665,162 | B2* | 5/2017 | Chueh | G06F 1/3262 |
| 9,870,056 | B1* | 1/2018 | Yao | G06F 3/011 |
| 9,891,821 | B2* | 2/2018 | Luo | G06F 1/1626 |
| 2008/0240514 | A1* | 10/2008 | Zhang | G06K 9/00006 |
| | | | | 382/115 |
| 2010/0097324 | A1* | 4/2010 | Anson | G06F 3/04883 |
| | | | | 345/173 |
| 2010/0134423 | A1* | 6/2010 | Brisebois | G06F 3/03547 |
| | | | | 345/173 |
| 2011/0043475 | A1* | 2/2011 | Rigazio | G06F 3/04883 |
| | | | | 345/173 |
| 2011/0195782 | A1* | 8/2011 | Mao | G06F 3/0317 |
| | | | | 463/37 |
| 2011/0237324 | A1* | 9/2011 | Clavin | G06K 9/00369 |
| | | | | 463/29 |
| 2013/0288647 | A1* | 10/2013 | Turgeman | H04W 12/06 |
| | | | | 455/411 |
| 2013/0321309 | A1* | 12/2013 | Tokutake | G06F 3/0488 |
| | | | | 345/173 |
| 2013/0326583 | A1* | 12/2013 | Freihold | G06F 3/04815 |
| | | | | 726/3 |
| 2013/0342672 | A1 | 12/2013 | Gray et al. | |
| 2014/0143666 | A1 | 5/2014 | Kennedy et al. | |
| 2014/0184519 | A1* | 7/2014 | Benchenaa | G06F 3/0488 |
| | | | | 345/173 |
| 2015/0111558 | A1* | 4/2015 | Yang | G04G 21/04 |
| | | | | 455/418 |
| 2015/0130737 | A1* | 5/2015 | Im | G06F 1/3265 |
| | | | | 345/173 |
| 2015/0143276 | A1* | 5/2015 | Luo | G06F 1/1626 |
| | | | | 715/773 |
| 2015/0153835 | A1* | 6/2015 | Perez | G06F 3/017 |
| | | | | 345/156 |
| 2015/0213244 | A1* | 7/2015 | Lymberopoulos | G06F 21/32 |
| | | | | 726/18 |
| 2015/0269783 | A1* | 9/2015 | Yun | G02B 27/0172 |
| | | | | 345/633 |
| 2016/0266698 | A1 | 9/2016 | Wang et al. | |

FOREIGN PATENT DOCUMENTS

| | | |
|---|---|---|
| CN | 102306053 A | 1/2012 |
| CN | 102307526 | 1/2012 |
| CN | 102763059 A | 10/2012 |
| CN | 103197885 | 7/2013 |
| CN | 103309593 A | 9/2013 |
| CN | 103577068 | 2/2014 |
| CN | 103637807 | 3/2014 |
| CN | 104056443 | 9/2014 |
| CN | 104391646 | 3/2015 |
| WO | 2014189612 | 11/2014 |

OTHER PUBLICATIONS

EPO, Office Action for EP Application No. 15861280, dated Jun. 22, 2018.

* cited by examiner

METHOD AND DEVICE FOR ADJUSTING OBJECT ATTRIBUTE INFORMATION

CROSS-REFERENCE TO RELATED APPLICATION

This application is a U.S. national phase of International Application No. PCT/CN2015/081872, filed on Jun. 18, 2015, which claims priority to and benefits of Chinese Patent Application Serial No. 201410663111.0, titled with "method and device for adjusting object attribute information", and filed with the State Intellectual Property Office of P. R. China on Nov. 19, 2014 by Baidu Online Network Technology (Beijing) Co., Ltd., the entire content of which is incorporated herein by reference.

FIELD

The present disclosure relates to a field of mobile terminal technology, and more specifically, to a method and a device for adjusting object attribute information.

BACKGROUND

With the rapid developments of internet technology, mobile terminals (e.g. mobile phones, tablet computers, etc.) are more and more popular, and screens, as an important component of mobile terminals, have also gone through a series of developments, from the original black-white screens to gray screens with better image performance, and then to subsequent color screens, the coloring number on color screens increasing and the resolution ratio increasing continuously. The touch screen (a kind of color screen) has been used in mobile terminals more and more often. It can be seen that, as the development of mobile terminal screen, operation experience of the users also changes.

In addition, along with the developments of technology, mobile terminals can provide more and more functions. For example, users can install all kinds of applications (Apps) freely, and installing dozens of Apps in a mobile terminal has been such a common situation. Therefore, how to make it easy for users to operate these Apps or check content in a terminal is a very important issue.

However, in practice, an object such as a button, a menu and a toolbar has a fixed position or size in different Apps or on different interfaces, but hand-palms of different users are not in the same size, and thus it causes inconvenience in operation. For example, when a user operates the mobile phone by his right hand, the length of a thumb of the right hand determines an operational area, and if the thumb of the user's right-hand cannot reach the operational area, then it will be very inconvenient for the user to perform related operations on the mobile terminal. Moreover, when there are contents unfit for juveniles in the mobile terminal, there is no way to prevent juveniles from watching the contents via the mobile terminal.

SUMMARY

The present disclosure aims to solve at least one of the problems existing in the related art to at least some extent.

For this, a method for adjusting object attribute information according to embodiments of a first aspect of the present disclosure includes: acquiring a movement trail of a terminal according to a user's operation on the terminal; determining a hand palm length of the user according to the movement trail and pre-stored somatotype characteristic information; and adjusting attribute information of an operational object in a current interface of the terminal according to the hand palm length of the user.

A storage medium according to embodiments of a third aspect of the present disclosure is provided for storing application programs, in which the application programs are configured to perform a method for adjusting object attribute information according to embodiments of the first aspect of the present disclosure.

A mobile terminal according to embodiments of a fourth aspect of the present disclosure includes: one or more processors; a memory; one or more modules, stored in the memory, and configured to perform the following operations when executed by the one or more processors: acquiring a movement trail of a terminal according to a user's operation on the terminal; determining a hand palm length of the user according to the movement trail and pre-stored somatotype characteristic information; and adjusting attribute information of an operational object in a current interface of the user according to the hand palm length of the user.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
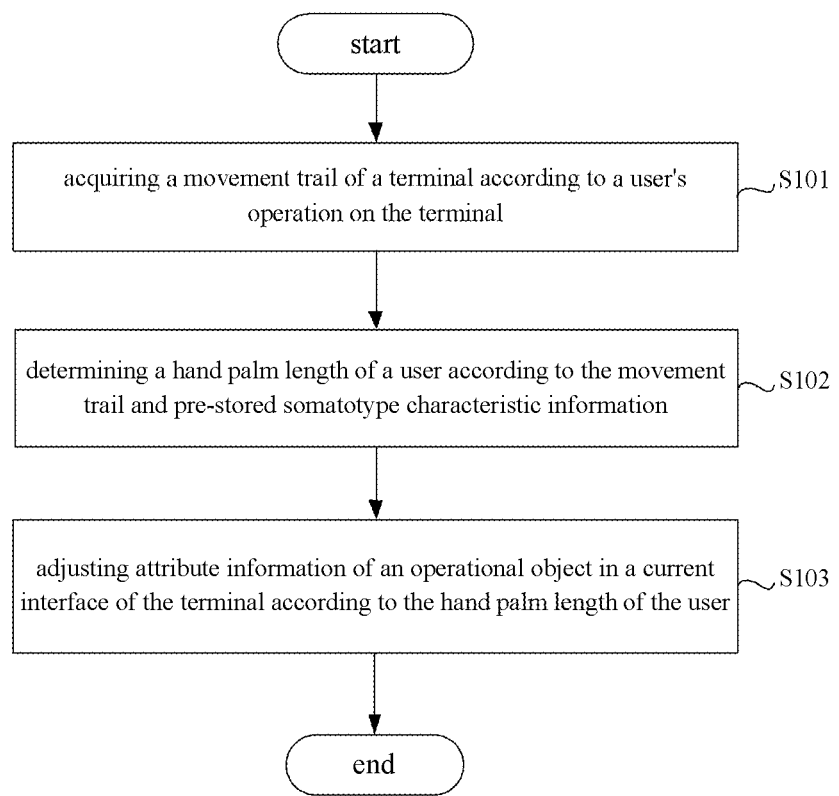
FIG. 1 is a flow chart of a method for adjusting object attribute information according to an embodiment of the present disclosure.

Embodiments of the present disclosure will be described in detail and examples of embodiments are shown in the drawings. The same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

In the following, a method and a device for adjusting object attribute information according to embodiments of the present disclosure will be described with reference to drawings.

FIG. 1 is a flow chart of a method for adjusting object attribute information according to an embodiment of the present disclosure.

As shown in FIG. 1, the method for adjusting object attribute information includes following actions.

In block S101, a movement trail of a terminal is acquired according to a user's operation on the terminal.

In this embodiment, the movement trail of the terminal can be acquired via a gyroscope located inside the terminal. The gyroscope may be a three-axial gyroscope. The three-axial gyroscope can measure an angular velocity so as to determine a motion state of an object, and thus it is also called as a motion sensor. In other words, the three-axial gyroscope makes the terminal know where it is and where it is going to, i. e. can acquire the movement trail of the mobile terminal. So-called "movement trail" means a route which the terminal passes through from its initial position to final position. The terminal may be a mobile phone, a tablet computer, and the like.

In detail, when a user picks up the mobile phone from a table and puts it at a position fit for operation, the gyroscope is able to acquire the movement trail of the mobile phone.

In block S102, a hand palm length of the user is determined according to the movement trail and pre-stored somatotype characteristic information.

The pre-stored somatotype characteristic information may include a correspondence relationship between arm lengths and hand palm lengths, advantageously, may include a correspondence relationship of areas to which users belong, arm lengths and hand palm lengths, for example, a correspondence relationship of Asians and the corresponding sizes of arms and hand palms, a correspondence relationship of Africans and the corresponding sizes of arms and hand palms, and the like. Such a configuration is due to that peoples in different areas tend to have different correspondence relationships between sizes of arms and hand palms, for example, for arms of the same length, Africans have obvious bigger hand palms than Asians. Thus, constructing the correspondence relationship between the areas to which users belong and the sizes of arms and hand palms can increase an accuracy when calculating the hand palm length.

Figure 2:
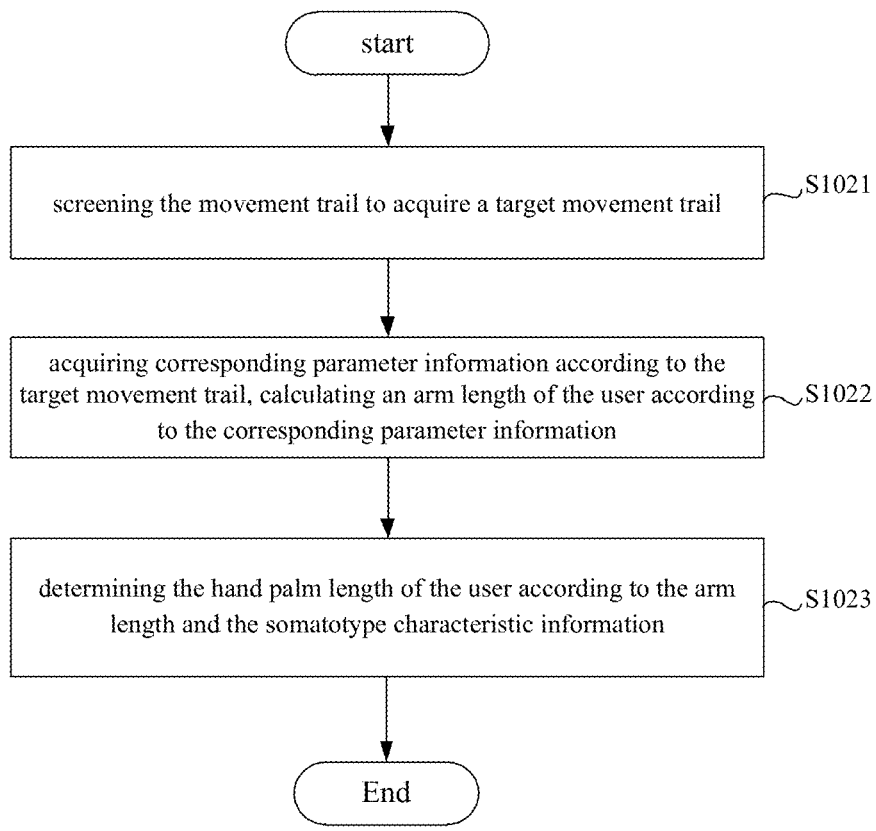
FIG. 2 is a flow chart of determining a hand palm length of a user according to an embodiment of the present disclosure.

In detail, as shown in FIG. 2, S102 may include following actions.

In block S1021, the movement trail is screened to acquire a target movement trail.

An initial angle of the mobile terminal can be acquired according to the movement trail, and according to the initial angle, it can be determined whether the corresponding movement trail is a movement trail meeting the requirement, i.e. a target movement trail. In addition, it can also be determined whether the corresponding movement trail is an "S-shaped" movement trail, for example, when the user takes out the mobile phone from his bag or pocket, the movement trail is the "S-shaped" trail. If the movement trail is the "S-shaped" trail, then it does not meet the requirement, and if the movement trail is not the "S-shaped" trail, then it can be used as the target movement trail.

In block S1022, corresponding parameter information is acquired according to the target movement trail, and the arm length of the user is calculated according to the corresponding parameter information, in which the corresponding parameter information includes one or more of a movement amplitude, a movement angle and a movement acceleration.

After the target movement trail is acquired, corresponding parameter information such as the movement amplitude, angle and acceleration can also be acquired, and then the arm length of the user can be calculated according to this parameter information.

Figure 3:
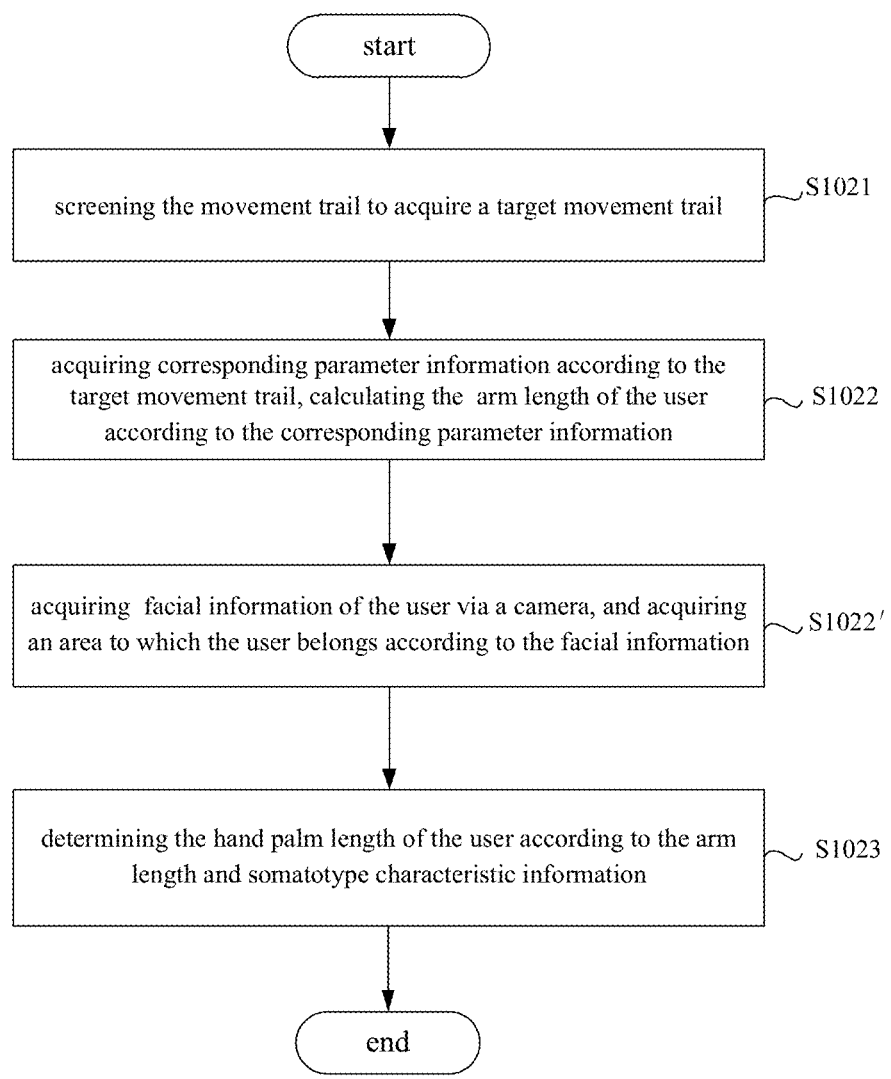
FIG. 3 is a flow chart of determining a hand palm length of a user according to another embodiment of the present disclosure.

Moreover, as shown in FIG. 3, the method may also include following actions.

In block S1022', facial information of the user is acquired via a camera, and an area to which the user belongs is acquired according to the facial information.

In block S1023, the hand palm length of the user is determined according to the arm length of the user and the somatotype characteristic information;

If the somatotype characteristic information only contains the correspondence relationship between arm sizes and hand palm sizes, then the hand palm length of the user is calculated according to the arm length and the somatotype characteristic information.

If the somatotype characteristic information includes the correspondence relationship of areas to which users belong, arm sizes and hand palm sizes, then the hand palm length of the user can be determined according to the arm length of the user, the area to which the user belongs and the somatotype characteristic information.

In block S103, the attribute information of an operational object in a current interface of the terminal is adjusted according to the hand palm length of the user.

After the hand palm length of the user is determined, the attribute information of the operational object in current interface of the terminal may be adjusted according to the user's hand palm length, for example, a size and a location of the operational object can be adjusted such that the adjusted operational object is bigger than or smaller than the operational object before adjusting, and the location can also be changed for user's convenience, in which the operational object includes but is not limited to a menu, a toolbar, and a press button.

With above method embodiments for adjusting object attribute information, by acquiring the movement trail of the terminal according to the user's operation on the terminal, by determining the hand palm length of the user according to the movement trail and the pre-stored somatotype characteristic information, and by adjusting the attribute information of the operational object in the current interface of the terminal according to the user's hand palm length, it is convenient for the user to make related operations, and the user's operation experience is improved.

Figure 4:
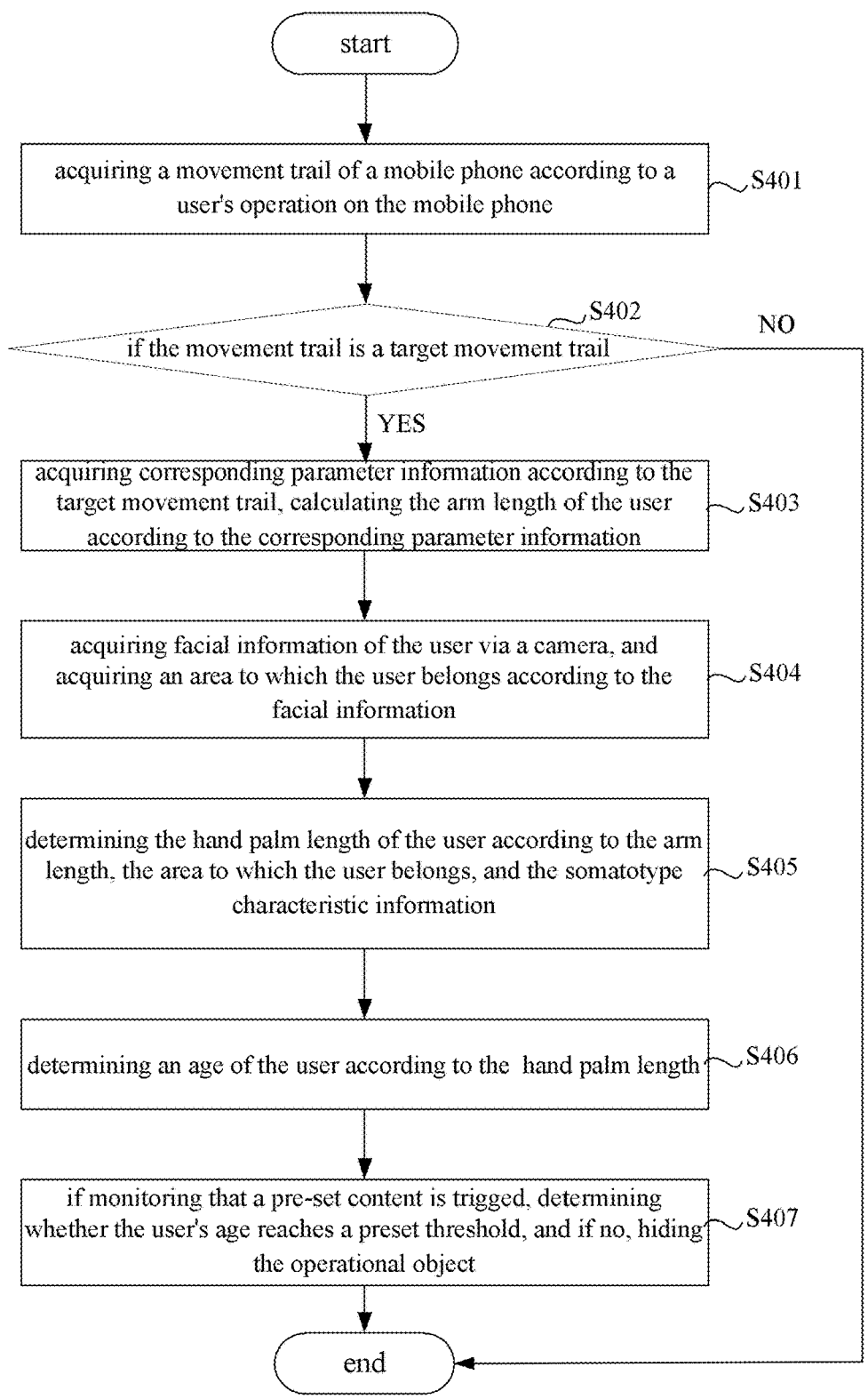
FIG. 4 is a flow chart of a method for adjusting object attribute information according to another embodiment of the present disclosure.

FIG. 4 is a flow chart of a method for adjusting object attribute information according to another embodiment of the present disclosure.

As shown in FIG. 4, the method for adjusting object attribute information includes following actions.

In block S401, a movement trail of a mobile phone is acquired according to a user's operation on the mobile phone.

In this embodiment, the movement trail of the mobile phone can be acquired via a gyroscope located inside the mobile phone. The gyroscope can be a three-axial gyroscope.

In block S402, it is determined if the movement trail is a target movement trail, if yes, block S403 is executed, and if no, the process ends.

In detail, an initial angle of the mobile phone can be acquired according to the movement trail, and according to the initial angle, it can be determined whether the corresponding movement trail is a movement trail meeting the requirement, i.e. the target movement trail. In addition, it can also be determined whether the corresponding movement trail is an "S-shaped" movement trail, for example, when a user takes out the mobile phone from his bag or pocket, the movement trail is the "S-shaped" trail. If the movement trail is the "S-shaped" trail, then it does not meet the requirement, and if the movement trail is not the "S-shaped" trail, then it could be used as the target movement trail.

In block S403, corresponding parameter information is acquired according to the target movement trail, and an arm length of the user is calculated according to the corresponding parameter information, in which the corresponding parameter information includes one or more of a movement amplitude, a movement angle and a movement acceleration.

After the target movement trail is acquired, corresponding parameter information such as the movement amplitude, angle and acceleration can also be acquired, and then the arm length of the user can be calculated according to this parameter information.

In block S404, facial information of the user is acquired via a camera, and an area to which the user belongs is acquired according to the facial information.

In block S405, a hand palm length of the user is determined according to the arm length, the area to which the user belongs and the somatotype characteristic information.

In block S406, an age of the user is determined according to the hand palm length.

In block S407, when it is monitored that a preset content is triggered, it is determined whether the user's age reaches a preset threshold, and if no, the operational object is hidden.

In detail, the preset content refer to content unfit for juveniles, for example, violent videos. When it is monitored that these contents are triggered, it is determined whether the user's age reaches 16, and if no, the operational object is hidden, for example play button is hidden, such that the user can't watch the contents.

With the above method embodiment for adjusting object attribute information, by determining a user's age according to the size of his hand palm, and then determining whether it is fit for the user to watch the preset content according to the user's age, and hiding the operational object if it is not fit for the user to watch the preset content, users such as juveniles cannot perform related operations on the preset content, thus achieving the effect of limiting the preset content, and improving the user's satisfaction.

To achieve above embodiments, the present disclosure also provides a device for adjusting object attribute information.

Figure 5:
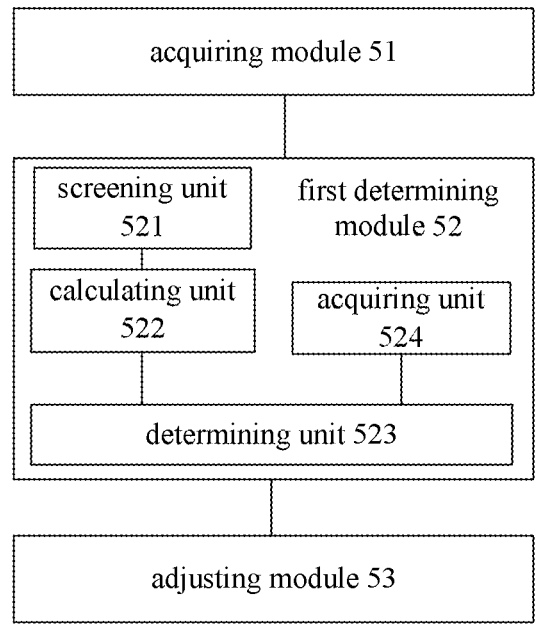
FIG. 5 is a block diagram of a device for adjusting object attribute information according to an embodiment of the present disclosure.

FIG. 5 is a block diagram of a device for adjusting object attribute information according to an embodiment of the present disclosure.

As shown in FIG. 5, the device for adjusting object attribute information includes an acquiring module 51, a first determining module 52 and an adjusting module 53.

The acquiring module 51 is configured to acquire a movement trail of a terminal according to a user's operation on the terminal. The first determining module 52 is configured to determine the hand palm length of the user according to the movement trail acquired by the acquiring module 51 and pre-stored somatotype characteristic information. The adjusting module 53 is configured to adjust attribute information of an operational object in a current interface of the terminal according to the hand palm length of the user determined by the first determining module 52.

In this embodiment, the acquiring module 51 may acquire the movement trail of the terminal via a gyroscope located inside the terminal. In detail, the gyroscope may be a three-axis gyroscope. The three-axis gyroscope can measure an angular velocity, so as to determine a motion state of an object, and thus it is also called as a motion sensor. In other words, the three-axis gyroscope makes the terminals know where it is and where it is going, i. e., can acquire the movement trail of the terminal. So-called "movement trail" means a route which the terminal passing through from its initial position to final position. The terminal may be a mobile phone, a tablet computer, and the like.

The pre-stored somatotype characteristic information may include a correspondence relationship between arm lengths and hand palm lengths, advantageously, may include a correspondence relationship of areas to which users belong, arm lengths and hand palm lengths, for example, a correspondence relationship of Asians and the corresponding sizes of arms and hand palms, a correspondence relationship of Africans and the corresponding sizes of arms and hand palms, and the like. Such a configuration is due to that peoples in different areas tend to have different correspondence relationships between sizes of arms and hand palms, for example, for arms of the same length, Africans have obvious bigger hand palms than Asians. Thus, constructing the correspondence relationship between the areas to which users belong and the sizes of arms and hand palms can increase an accuracy when calculating the hand palm length.

Specifically, the first determining module 52 may include a screening unit 521, a calculating unit 522 and a determining unit 523. The screening unit 521 is configured to screen the movement trail to acquire a target movement trail. The calculating unit 522 is configured to acquire corresponding parameter information according to the target movement trail, and to calculate an arm length of the user according to the corresponding parameter information, in which the corresponding parameter information includes one or more of a movement amplitude, a movement angle and a movement acceleration. The determining unit 523 is configured to determine the hand palm length of the user according to the arm length of the user and the somatotype characteristic information.

More specifically, the screening unit 521 acquires an initial angle of the mobile terminal according to the movement trail, and determines whether the corresponding movement trail is a movement trail meeting the requirement, i.e., the target movement trail, according to the initial angle. In addition, the screening unit 521 may also determine whether the corresponding movement trail is a "S-shaped" trail, for example, when the user takes out the mobile phone from his/her pocket or bag, the movement trail is the "S-shaped" trail. If the movement trail is the "S-shaped" trail, then it does not meet the requirement, and if the movement trail is not "S-shaped", then it can be used as an object movement trail.

Furthermore, the first determining module 52 may also include an acquiring unit 524. The acquiring unit 524 is configured to acquire facial information of the user via a camera, and to acquire an area to which the user belongs according to the facial information. The determining unit 523 may specifically be configured to: calculate the hand palm length of the user according to the arm length of the user, the area to which the user belongs and the somatotype characteristic information, in which the somatotype characteristic information includes a correspondence relationship of areas to which users belong, arm lengths and hand palm lengths.

After the hand palm length of the user is determined by the first determining module 52, the adjusting module 53 may adjust attribute information of the operational object in the current interface of the user according to the hand palm length of the user, for example, adjust a size and a location of the operational object to make the adjusted operational object bigger than or smaller than the operational object before adjusting, and may also change the location of the operational object for the user's convenience, in which the operational object includes but is not limited to a menu, a toolbar, and a press button.

The process of adjusting the attribute information of the operational object performed by the device for adjusting object attribute information including the acquiring module 51, the first determining module 52, and the adjusting module 53 is shown with reference to FIGS. 1-3, which will not be elaborated here.

With the device for adjusting object attribute information according to embodiments of the present disclosure, the movement trail of the terminal is acquired by the acquiring module, the hand palm length of the user is determined by the first determining module according to the movement trail and the pre-stored somatotype characteristic information, and then the attribute information of the operational object in the current interface of the terminal is adjusted by the adjusting module according to the hand palm length of the user, such that it is convenient for the user to make related operations, and the user's operation experience is improved.

Figure 6:
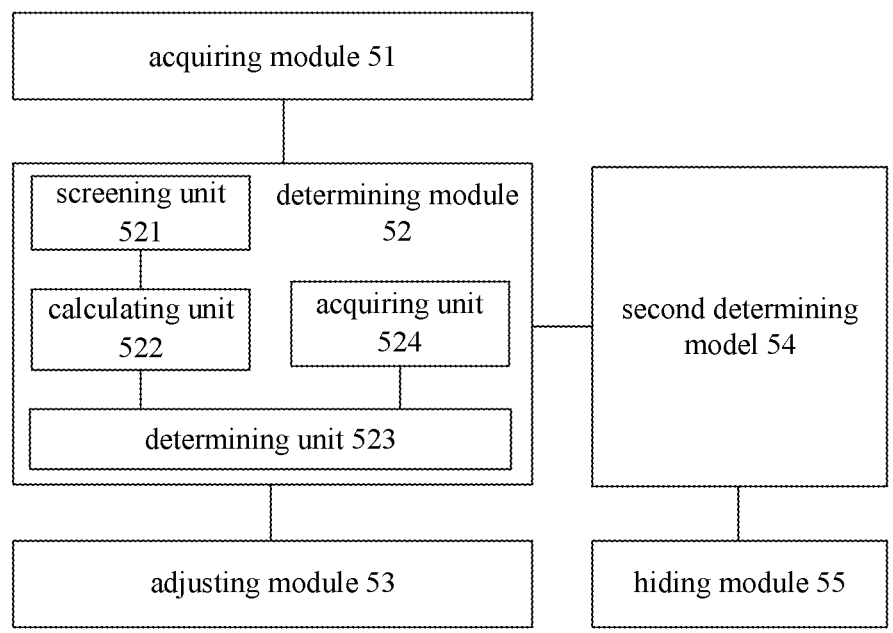
FIG. 6 is a block diagram of a device for adjusting object attribute information according to another embodiment of the present disclosure.

In addition, as shown in FIG. 6, the device may further include a second determining module 54. The second determining model 54 is configured to determine a user's age according to the hand palm length after the user's hand palm length is determined by the first determining module 52. Further, the device may also include a hiding module 55. The hiding module 55 is configured to, determine whether the user's age reaches a preset threshold if it is monitored that a preset content is triggered, and to hide the preset content if the user's age does not reach the preset threshold, after the second determining module 54 determines the user's age according to the hand palm length.

The process of adjusting the attribute information of the operational object performed by the device for adjusting object attribute information including the acquiring module 51, the first determining module 52, the adjusting module 53, the second determining module 54 and the hiding module 55 is shown with reference to FIGS. 1-4, which will not be elaborated here.

With the above method embodiment for adjusting object attribute information, by determining a user's age according to the size of his hand palm, and then determining whether it is fit for the user to watch the preset content according to the user's age, and hiding the operational object if it is not fit for the user to watch the preset content, users such as juveniles cannot perform related operations on the preset content, thus achieving the effect of limiting the preset content, and improving the user's satisfaction.

To achieve above embodiments, the present disclosure also provides a storage medium. The storage medium is adaptive for storing application programs, the in which the application programs are configured to perform the method of adjusting object attribute information according to any one of embodiments of the present disclosure.

To achieve above embodiments, the present disclosure also provides a mobile terminal. The mobile terminal includes: one or more processors; a memory; one or more modules, stored in the memory, and when executed by the one or more processors, configured to perform the following operations:

S101', acquiring a movement trail of a terminal according to a user's operation on the terminal.

S102', determining a hand palm length of the user according to the movement trail and pre-stored somatotype characteristic information.

S103', adjusting attribute information of an operational object in a current interface of the terminal according to the hand palm length of the user.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. Moreover, those skilled in the art could combine different embodiments or different characteristics in embodiments or examples described in the present disclosure.

In addition, terms such as "first" and "second" are used herein for purposes of description and are not intended to indicate or imply relative importance or significance or to imply the number of indicated technical features. Thus, the features defined with "first" and "second" may comprise or imply at least one of these features. In the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art. The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc. Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. A method for adjusting object attribute information, comprising:
   one or more processors for:
   acquiring a movement trail of a terminal according to a user's operation on the terminal;
   determining a hand palm length of the user according to the movement trail and according to pre-stored somatotype characteristic information; and
   adjusting attribute information of an operational object in a current interface of the terminal according to the hand palm length of the user;
   wherein, in the determining the hand palm length of the user according to the movement trail and the pre-stored somatotype characteristic information, the one or more processors are further configured for:
      screening the movement trail to acquire a target movement trail;
      acquiring a corresponding parameter information according to the target movement trail; calculating, with the one or more processors, an arm length of the user according to the corresponding parameter information, in which the corresponding parameter information comprises one or more of a movement amplitude, a movement angle and a movement acceleration; and
      determining the hand palm length of the user according to the arm length of the user and the somatotype characteristic information.

2. The method according to claim 1, wherein, acquiring a movement trail of a terminal according to a user's operation on the terminal comprises:
   acquiring the movement trail of the terminal via a gyroscope located inside the terminal according to the user's operation on the terminal.

3. The method according to claim 1, further comprising:
   acquiring facial information of the user via a camera, and acquiring an area to which the user belongs according to the facial information.

4. The method according to claim 1, wherein, determining the hand palm length of the user according to the arm length of the user and the somatotype characteristic information comprises:
   determining the hand palm length of the user according to the arm length of the user, the area to which the user belongs and the somatotype characteristic information, in which the somatotype characteristic information comprises a correspondence relationship of areas to which users belong, arm lengths and hand palm lengths.

5. The method according to claim 1, further comprising:
   determining an age of the user according to the hand palm length, after the hand palm length of the user is determined.

6. The method according to claim 5, wherein, after determining the age of the user, further comprising:
   when monitoring that a preset content is triggered, determining whether the age of the user reaches a preset threshold;
   if the age of the user does not reach the preset threshold, hiding the operational object.

7. The method according to claim 6, wherein, the attribute information of the operational object comprises a size and a location of the operational object, and the operational object comprises a menu, a toolbar, and a press button.

8. A non-transitory storage medium with instructions stored thereon, that when executed by a processor, perform a method for adjusting object attribute information, and the method comprising:
   acquiring a movement trail of a terminal according to a user's operation on the terminal;
   determining a hand palm length of the user according to the movement trail and according to pre-stored somatotype characteristic information; and
   adjusting attribute information of an operational object in a current interface of the terminal according to the hand palm length of the user;
   wherein, determining the hand palm length of the user according to the movement trail and the pre-stored somatotype characteristic information comprises:
      screening the movement trail to acquire a target movement trail;
      acquiring a corresponding parameter information according to the target movement trail; calculating an arm length of the user according to the corresponding parameter information, in which the corresponding parameter information comprises one or more of a movement amplitude, a movement angle and a movement acceleration; and
      determining the hand palm length of the user according to the arm length of the user and the somatotype characteristic information.

9. A mobile terminal, comprising:
one or more processors;
a memory;
one or more modules, stored in the memory, and configured to perform following operations when executed by the one or more processors:
  acquiring a movement trail of the mobile terminal according to a user's operation on the mobile terminal;
  determining a hand palm length of the user according to the movement trail and according to pre-stored somatotype characteristic information; and
  adjusting attribute information of an operational object in a current interface of the mobile terminal according to the hand palm length of the user;
  wherein, in the determining the hand palm length of the user according to the movement trail and the pre-stored somatotype characteristic information, the one or more modules are further configured to perform the following the operations when executed by the one or more processors:
    screening the movement trail to acquire a target movement trail;
    acquiring a corresponding parameter information according to the target movement trail; calculating, with the one or more processors, an arm length of the user according to the corresponding parameter information, in which the corresponding parameter information comprises one or more of a movement amplitude, a movement angle and a movement acceleration; and
    determining the hand palm length of the user according to the arm length of the user and the somatotype characteristic information.

10. The mobile terminal according to claim 9, further comprising:
  a gyroscope, configured to measure an angular velocity of the mobile terminal, such that the movement trail of the mobile terminal is acquired according to the angular velocity of the mobile terminal.

11. The mobile terminal according to claim 9, further comprising:
  a camera, configured to acquire facial information of the user;
  wherein the one or more modules are further configured to acquire an area to which the user belongs according to the facial information, when executed by the one or more processors.

12. The mobile terminal according to claim 9, wherein the one or more modules are configured to perform following operations when executed by the one or more processors:
  determining the hand palm length of the user according to the arm length of the user, the area to which the user belongs and the somatotype characteristic information, in which the somatotype characteristic information comprises a correspondence relationship of areas to which users belong, arm lengths and hand palm lengths.

13. The mobile terminal according to claim 9, wherein the one or more modules are further configured to determine an age of the user according to the hand palm length of the user, when executed by the one or more processors.

14. The mobile terminal according to claim 13, wherein the one or more modules are further configured to perform following operations when executed by the one or more processors:
  when monitoring that a preset content is triggered, determining whether the age of the user reaches a preset threshold;
  if the age of the user does not reach the preset threshold, hiding the operational object.

15. The mobile terminal according to claim 9, wherein, the attribute information of the operational object comprises a size and a location of the operational object, and the operational object comprises a menu, a toolbar, and a press button.

* * * * *